(12) United States Patent
Zurliene

(10) Patent No.: US 10,376,826 B2
(45) Date of Patent: Aug. 13, 2019

(54) FILTER ASSEMBLIES AND METHODS FOR PRODUCING FILTER ASSEMBLIES

(71) Applicant: John Zurliene, Spring Valley, IL (US)

(72) Inventor: John Zurliene, Spring Valley, IL (US)

(*) Notice: Subject to any disclaimer, the term of this patent is extended or adjusted under 35 U.S.C. 154(b) by 98 days.

(21) Appl. No.: 15/374,754

(22) Filed: Dec. 9, 2016

(65) Prior Publication Data

US 2017/0087498 A1 Mar. 30, 2017

Related U.S. Application Data

(62) Division of application No. 14/516,964, filed on Oct. 17, 2014, now Pat. No. 9,522,354.

(60) Provisional application No. 61/895,575, filed on Oct. 25, 2013.

(51) Int. Cl.
| | |
|---|---|
| *B01D 46/24* | (2006.01) |
| *B01D 46/52* | (2006.01) |
| *B01D 46/00* | (2006.01) |

(52) U.S. Cl.
CPC ..... *B01D 46/2414* (2013.01); *B01D 46/0001* (2013.01); *B01D 46/0004* (2013.01); *B01D 46/0005* (2013.01); *B01D 46/2411* (2013.01); *B01D 46/521* (2013.01); *B01D 2265/04* (2013.01); *Y10T 156/1002* (2015.01)

(58) Field of Classification Search
CPC .............. B01D 29/111; B01D 46/2411; B01D 46/2414; B01D 46/0001; B01D 46/0005; B01D 2265/04; B01D 46/521; B01D 2201/291; B01D 2201/293
See application file for complete search history.

(56) References Cited

U.S. PATENT DOCUMENTS

| | | |
|---|---|---|
| 2,739,916 A | 3/1956 | Parker |
| 5,487,767 A | 1/1996 | Brown |
| 5,660,729 A | 8/1997 | Baumann |
| RE36,129 E | 3/1999 | Buonpastore |
| 6,093,231 A | 7/2000 | Read |
| 6,159,261 A | 12/2000 | Binder |
| 2003/0015465 A1 | 1/2003 | Fick |
| 2009/0145826 A1 | 6/2009 | Calcaterra |
| 2011/0146490 A1 | 6/2011 | Derstler |

OTHER PUBLICATIONS

Canadian Intellectual Property Office, Office Action in connection with Canadian Patent Application No. 2,868,906, dated Nov. 14, 2016, 4 pages.

*Primary Examiner* — Robert Clemente
(74) *Attorney, Agent, or Firm* — Nyemaster Goode, P.C.

(57) ABSTRACT

A filter assembly having at least two filter caps produced from a planar composite sheet of heat liquefied adhesive and metal layer (typically sheet metal). The filter caps are adhered to a porous, typically pleated, filter media positioned, which is generally an air filter, within channels of each filter cap wherein the adhesive, typically a plastisol, adheres the filter caps to the filter media and can impregnate the filter media.

20 Claims, 9 Drawing Sheets

FILTER ASSEMBLIES AND METHODS FOR PRODUCING FILTER ASSEMBLIES

CROSS-REFERENCE TO RELATED APPLICATIONS

This application is a divisional of U.S. application Ser. No. 14/516,964, filed Oct. 17, 2014, now U.S. Pat. No. 9,522,354, entitled FILTER ASSEMBLIES AND METHODS FOR PRODUCING FILTER ASSEMBLIES, which claims the benefit of U.S. Provisional Patent Application No. 61/895,575, filed Oct. 25, 2013, entitled FILTER ASSEMBLIES AND METHODS FOR PRODUCING FILTER ASSEMBLIES. Each of these prior applications are incorporated herein by reference in their entirety and for all purposes.

BACKGROUND OF THE INVENTION

Currently manufacturers of industrial air filters use expensive, extremely messy and labor and time consuming methods for blending and applying a two part adhesive mix when assembling filters. The currently widely employed process typically involves placing a filter material into engagement with a filter cap and hand pouring an adhesive into engagement between the filter cap and the filter media. Unfortunately, the systems used involve large amounts of manual labor; are difficult to apply consistently and effectively due to the limited space between the filter cap and filter material; and/or are messy due to the expulsion of excess adhesive when the filter material is inserted into a channel of the filter cap. As a result, there is messy clean-up required virtually after each application of adhesive, significant costs due to manual labor necessary in order to produce the filter assemblies and other difficulties with the manufacturer of the air filter assemblies in this manner.

BRIEF SUMMARY OF THE INVENTION

These and other features, advantages, and objects of the present invention will be further understood and appreciated by those skilled in the art by reference to the following specification, claims, and appended drawings.

An aspect of the present invention includes a method of making a filter assembly that includes at least one filter cap and a filter media employing at least the following steps: forming a first composite sheet having a metal sheet layer and a plastisol (or other elevated heat activated adhesive that is liquid at elevated temperatures and solid at room temperature) adhered to a planar surface of the metal sheet layer in solid form at room temperature; stamping the composite sheet to form a first filter cap having a base section with a filter facing surface and an outer facing surface and at least one upwardly extending perimeter wall having a filter facing surface and an exterior facing surface where the at least one upwardly extending perimeter wall extends upwardly from the base section and where the perimeter wall defines the base section of the filter cap and wherein the filter facing surface of the base section and the filter facing surface of the upwardly extending perimeter wall each has the plastisol on the surface thereof; placing a filter media into contact with the plastisol on at least the filter facing surface of the base section; and applying heat to at least a portion of the plastisol of the first filter cap at a temperature sufficient to liquefy at least a portion of the plastisol of the first filter cap and cause the plastisol of the first filter cap to adhere to the filter material.

According to another aspect of the present invention, method of making a filter assembly includes the steps of: forming a first composite sheet comprising a metal layer having a planar surface and a surface layer on the planar surface comprising a heat liquefiable adhesive in solid form where the heat liquefiable adhesive is liquid at temperatures at least about 400° F. and solid at temperatures below about 350° F. where the heat liquefiable adhesive adheres to the planar surface of the metal sheet layer in solid form at room temperature; stamping the composite sheet to form a first filter cap having a base section with a filter facing surface and an outer facing surface and at least one upwardly extending perimeter wall having a filter facing surface and an exterior facing surface where the at least one upwardly extending perimeter wall extends upwardly from the base section and where the perimeter wall defines the base section of the filter cap and where the filter facing surface of the base section and the filter facing surface of the upwardly extending perimeter wall each have the heat liquefiable adhesive on the surface thereof; placing a filter media into contact with the heat liquefiable adhesive in physical contact with the filter facing surface of the base section and the filter facing surface of the upwardly extending perimeter wall; applying heat to at least a portion of the heat liquefiable adhesive of the first filter cap at a temperature sufficient to liquefy at least a portion of the heat liquefiable adhesive of the first filter cap and cause the heat liquefiable adhesive of the first filter cap to adhere to the filter material; placing a second filter cap having a base section with a filter facing surface and an outer facing surface and at least one upwardly extending perimeter wall having a filter facing surface and an exterior facing surface where the at least one upwardly extending perimeter wall extends upwardly from the base section and where the perimeter wall defines the base section of the filter cap and where the filter facing surface of the base section and the filter facing surface of the upwardly extending perimeter wall each have the heat liquefiable adhesive on the surface thereof; and applying heat to at least a portion of the heat liquefiable adhesive of the second filter cap at a temperature sufficient to liquefy at least a portion of the heat liquefiable adhesive of the second filter cap and cause the heat liquefiable adhesive of the second filter cap to adhere to the filter material.

Yet another aspect of the present invention includes a filter assembly having: a first and a second filter cap having a base section with a filter facing surface and an outer facing surface and at least one upwardly extending perimeter wall having a filter facing surface and an exterior facing surface where the at least one upwardly extending perimeter wall extends upwardly from the base section and where the perimeter wall defines the base section of the filter cap and where the filter facing surface of the base section and the filter facing surface of the upwardly extending perimeter wall each have a heat liquefiable adhesive on the surface thereof; a filter media adhered to the first and second filter caps by the heat liquefiable adhesive at a first filter cap engaging end portion and a second filter cap engaging end portion where the first filter cap engaging end portion and the second filter cap engaging end portion are opposite ends of the filter media and adhered such that the heat liquefiable adhesive impregnates at least a first filter cap engaging end portion and a second filter cap engaging end portion of the filter media and a metal exterior facing layer of the first filter cap and the second filter cap. The first filter cap and the second filter cap at least two layers of material, a metal layer on the exterior facing side of the heat liquefiable adhesive layer and where the heat liquefiable adhesive is liquid at temperatures at least about 400° F. and solid at temperatures below about 350° F. where the heat liquefiable adhesive adheres to the surface of the metal layer in solid form at room temperature.

These and other features, advantages, and objects of the present invention will be further understood and appreciated by those skilled in the art by reference to the following specification, claims, and appended drawings.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. Drawings are not necessary to scale. Certain features of the invention may be exaggerated, in scale, or shown in schematic form in the interest of clarity and conciseness.

DETAILED DESCRIPTION

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

The present invention is generally directed toward the method of making a filter assembly that includes at least one filter cap, typically two filter caps, and filter media disposed there between and a filter assembly where the filter assembly includes one or more filter caps, typically two, adhered to a filter media extending between the filter caps using a heat liquefiable/activated adhesive material, which is typically a plastisol or other material that is liquid at or above 400° F., more typically 450° F., even more typically 500° F., or higher and solid at room temperatures and temperatures below about 350° F.

Figure 1:
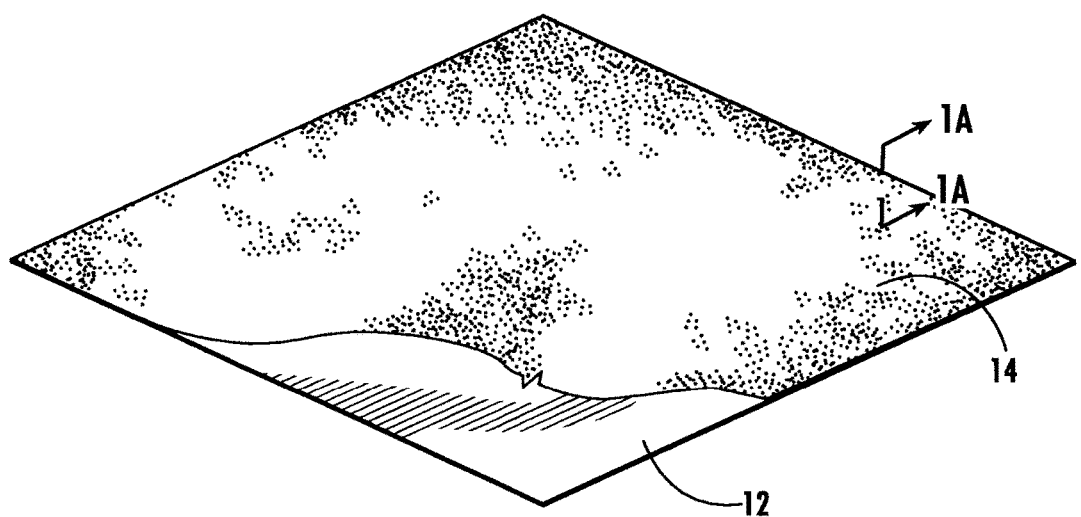
FIG. 1 is a perspective view of a composite sheet showing the heat liquefiable adhesive (plastisol) in its solid state attached to a metal (steel) substrate according to an aspect of the present invention.
Figure 1A:
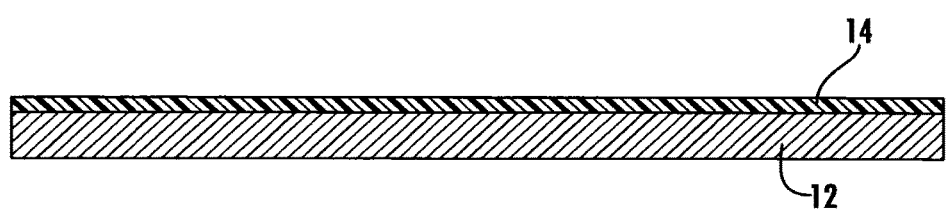
FIG. 1A is a cross section of the composite sheet of FIG. 1 taken along line 1A in FIG. 1.
Figure 2:
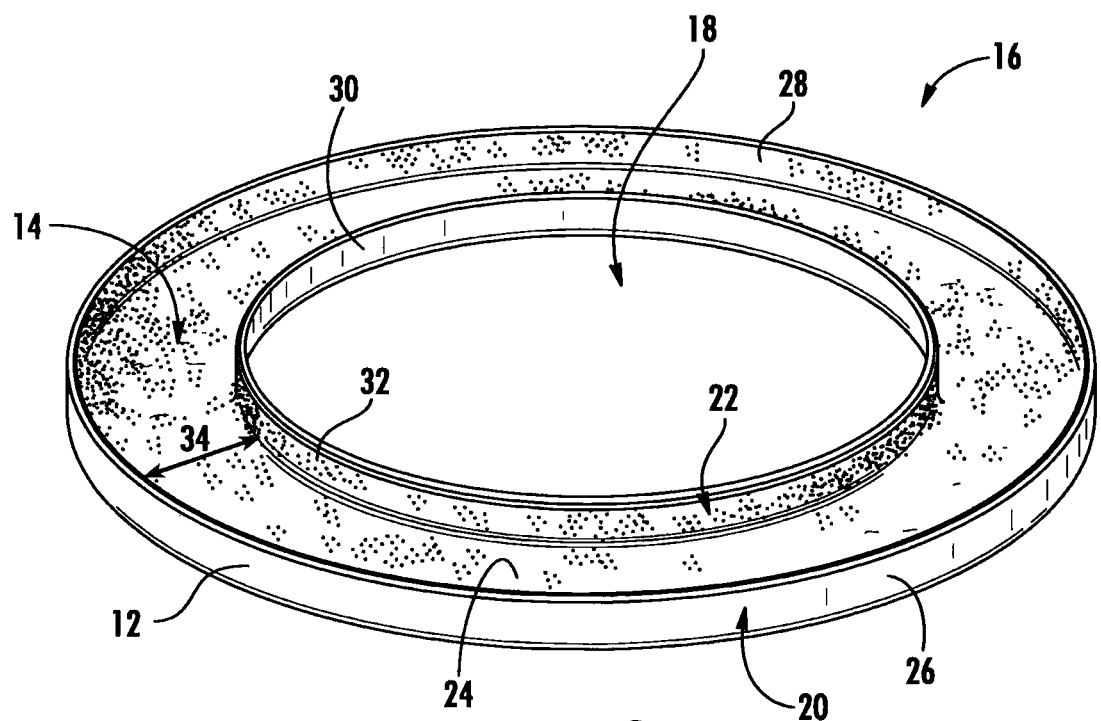
FIG. 2 is a front perspective view of a filter cap formed from a composite sheet according to an aspect of the present invention.

As shown in FIGS. 1-2, the filter caps are usually produced from a composite sheet 10. The composite sheet 10 is a composite of a planar metal sheet 12 and an adhesive 14 that is liquefied at temperatures above about 400/500° F. The heat liquefied adhesive is typically a plastisol. The adhesive material is sufficiently adherent to the metal sheet 12 such that the composite sheet 10 may be physically processed in the manner that filter cap assemblies not containing the adhesive material are currently processed, typically by dye stamping the composite sheet into the general size and shape of a filter cap 16 (see FIG. 2). The metal sheet layer, according the present invention, is typically a steel material, more typically a sheet steel material having a melting point of at least about 2500° F. Other metals may be used as appropriate but sheet steel is most typically utilized.

The filter cap 16 shown in FIG. 2 is exemplary in nature. While filter caps typically are circular they may have a perimeter of any shape including, for example, a rectangular or square shape. Filter caps may include an aperture 18 that is removed, cut or punched out of the composite sheet. The aperture shown in FIG. 2 passes through the center. The filter cap 16 may be solid across the entire surface without an aperture 18. As shown in FIG. 2, the filter cap 16 includes an outer upwardly extending wall 20 about the perimeter of the filter cap 16 and an inner upwardly extending wall 22. However, the filter cap may include an indented, typically bulbous, center section to establish a defined base 24 surface between the outer upwardly extending wall 20 and the center section similar to what is shown in FIG. 2 as defined between the inner upwardly extending wall and the outer upwardly extending wall. As shown in FIG. 2, once processed, the filter cap includes adhered adhesive on the interior facing sides of the inner and outer upwardly extending wall as well as the base 24.

The adhesive 14, as discussed above, is typically a heat liquefied adhesive such as a plastisol. Plastisol is a suspension of polyvinyl chloride or other polymeric particles in a liquid plasticizer where plastisol flows as a liquid and can be poured into a heated mold when heated to around about 177°

C. At or about around 177° C. the plastic and plasticizer mutually dissolve one another. The polyvinyl chloride (PVC) plastisol is typically a suspension of fine particles of PVC dispersion resin in a plasticizer and employs PVC particles having a particle size from about 15 to 0.2 mcg and smaller. Generally speaking, the PVC particles and plastisol consist of particles that are products of polymerization and agglomerates of polymerization that result from spray drying and subsequent grinding.

Generally speaking, the adhesive layer used may include other compounds that are liquefied at elevated temperatures between 400 and 500° F. or higher and solid at temperatures of about 350° F. or less, including at room temperature. This feature allows for the processing of the composite sheet into filter caps that may be further processed to adhere the filter caps to the filter media position between or within the filter cap.

The outer upwardly extending wall 20 includes an exterior surface 26 and an interior surface 28. The outer upwardly extending wall 20 and inner upwardly extending wall 22 are typically contiguous with the base 24 due to their formation from a single sheet of composite sheet 10 by stamping, typically with a dye stamp machine, to form the filter cap. Therefore, there is no fastener or adhesive required to adhere the outer or inner upwardly extending walls to a base formed from a unitary piece of composite sheet material. The inner facing surface of the inner upwardly extending wall 22 as well as the outer surface 26 of the outer upwardly extending wall are typically free of adhesive while the outer facing surface 32 of the inner upwardly extending wall 22 and the inner facing surface 28 of the outer upwardly extending wall 20 typically include adhesive adhered to their surface. This further facilitates adherence of the filter media to the filter cap when the filter media is inserted within the channel 34 formed between the inner and outer upwardly extending walls.

Figure 2A:
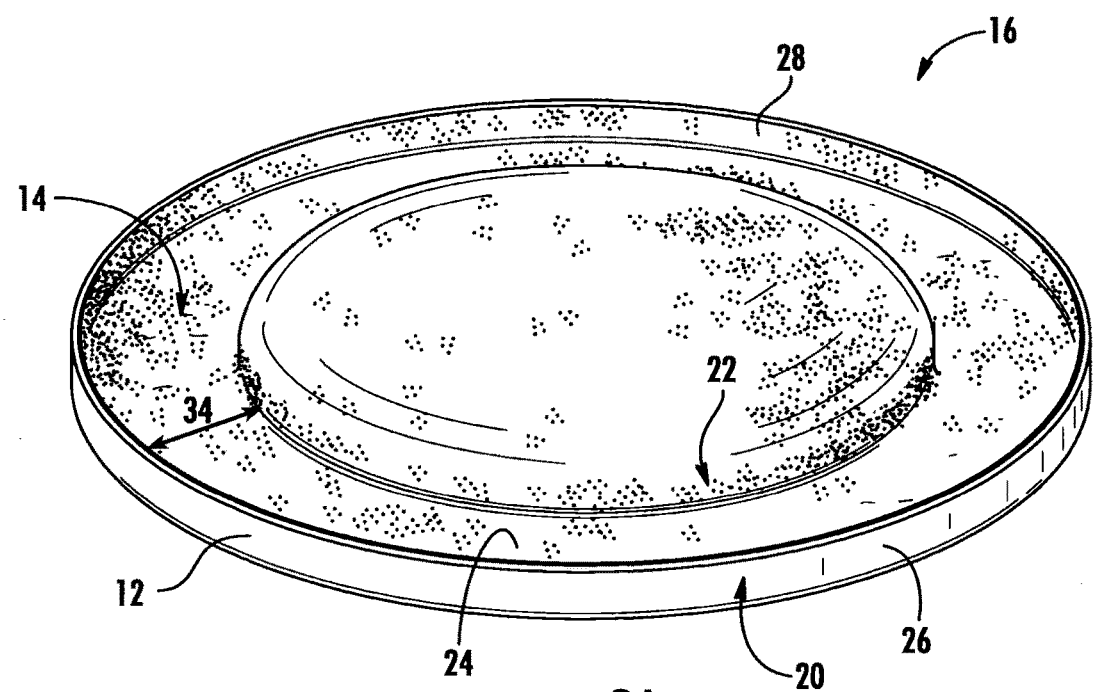
FIG. 2A is a front perspective view of a filter cap formed from a composite sheet according to an aspect of the present invention.
Figure 2B:
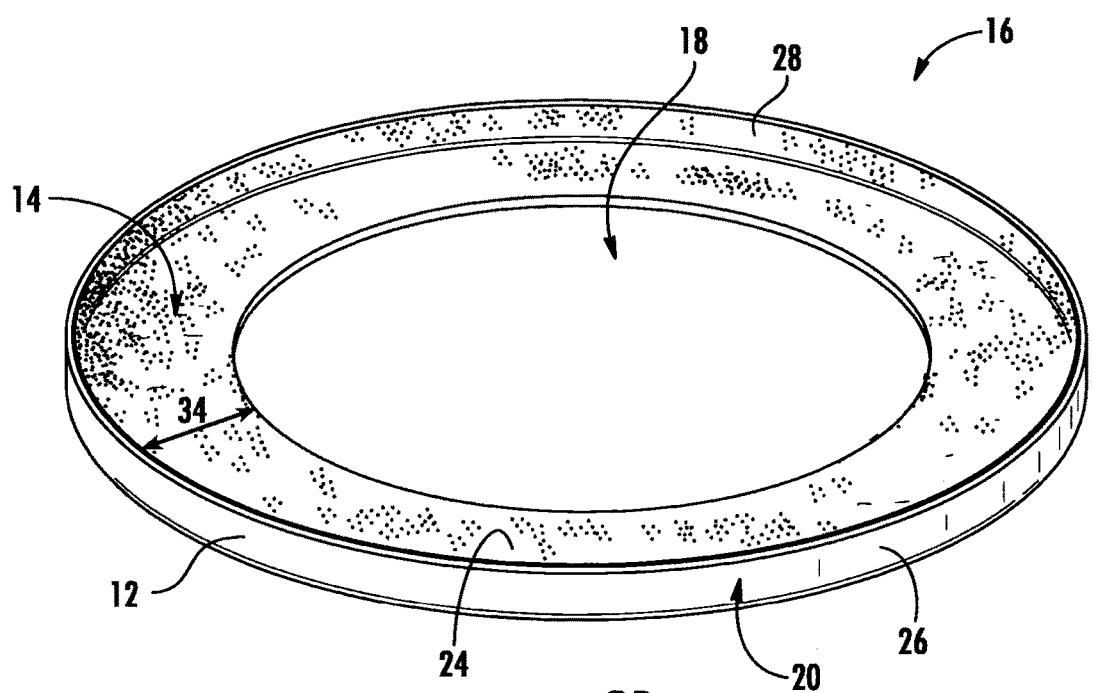
FIG. 2B is a front perspective view of a filter cap formed from a composite sheet according to an aspect of the present invention.
Figure 2C:
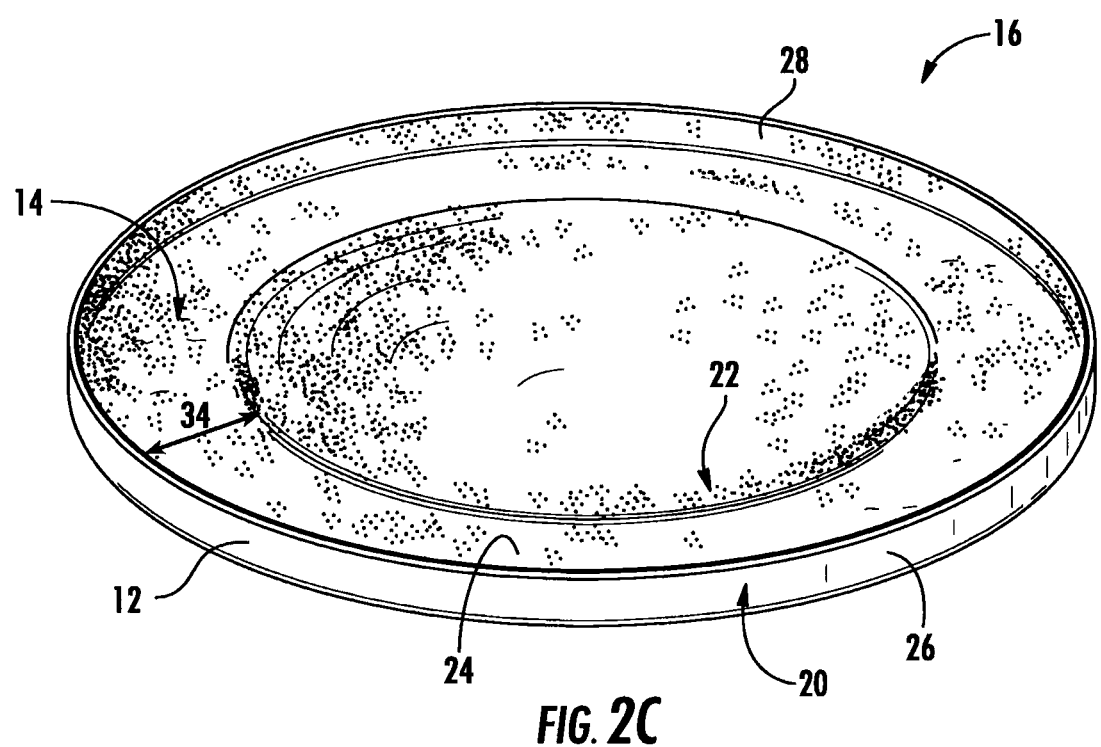
FIG. 2C is a front perspective view of a filter cap formed from a composite sheet according to an aspect of the present invention.

As discussed above, when a punched out aperture 18 is not formed in the filter cap, the channel 34 may be defined by an upwardly extending ridge of a bulbous center section that is stamped into the filter cap (see FIG. 2A) or the inner upwardly extending wall may be eliminated (see FIG. 2B). Typically, a width of a channel 34 is defined either between two walls or between a wall and an indented portion into a metal surface such as a stamped recess (FIG. 2C) or elevated (bulbous) center section (FIG. 2A) that replaces the aperture 18. This alteration can occur in either one or both of the filter caps.

Figure 3:
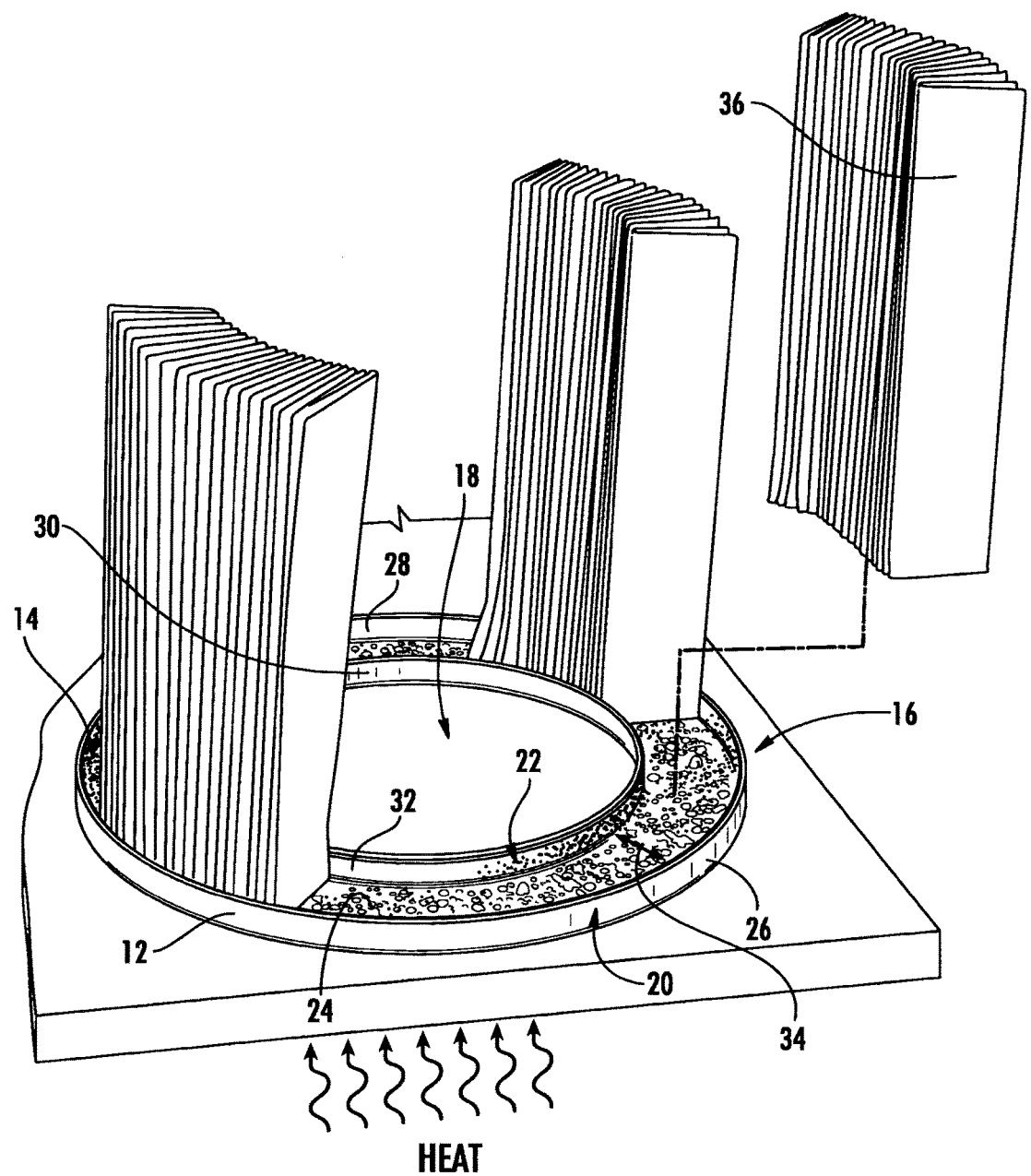
FIG. 3 is a perspective view showing the positioning of portions of a unitary pleated air filter material being inserted into the channel of a filter end cap and heat being applied to liquefy the plastisol and adhere the filter material to the filter end cap.

FIG. 3 shows a portion of a paper pleated air filter material as the filter media 36 being positioned within the channel 34. FIG. 3 shows sections of filter material removed for purposes of illustration. Sections are not typically employed rather a unitary paper pleated filter is inserted. The portions are shown in FIG. 3 primarily to better visualize the process and show heat being applied to the heat conductive metal, which in turn liquefies the plastisol adhesive. FIG. 3 illustrates the application of heat on a heat table below the base 24. The heat is sufficient to liquefy the adhesive, typically a plastisol. The liquefied adhesive adheres, and also impregnates some of the plastisol into the filter material, typically a paper filter material, to retain the filter material within the end cap. This creates a bond between the filter material and the metal layer of the filter cap(s). The heat activated adhesive is particularly effective, in that, due to its application on the composite sheet, the adhesive is present on both vertically extending walls adjacent the filter material and along the bottom of the filter material on the base 24. In this manner, as the plastisol or other heat activated adhesive is liquefied and adheres and/or impregnates the filter, it does so on a first end of the filter media approximate the first end cap and along the inner and outer seals proximate the walls 20, 22. When a second end cap is applied and heat is applied to the filter cap, a second end of the filter material and along the inner and outer seals proximate the walls 20, 22 is adhered to a second filter cap.

Figure 4:
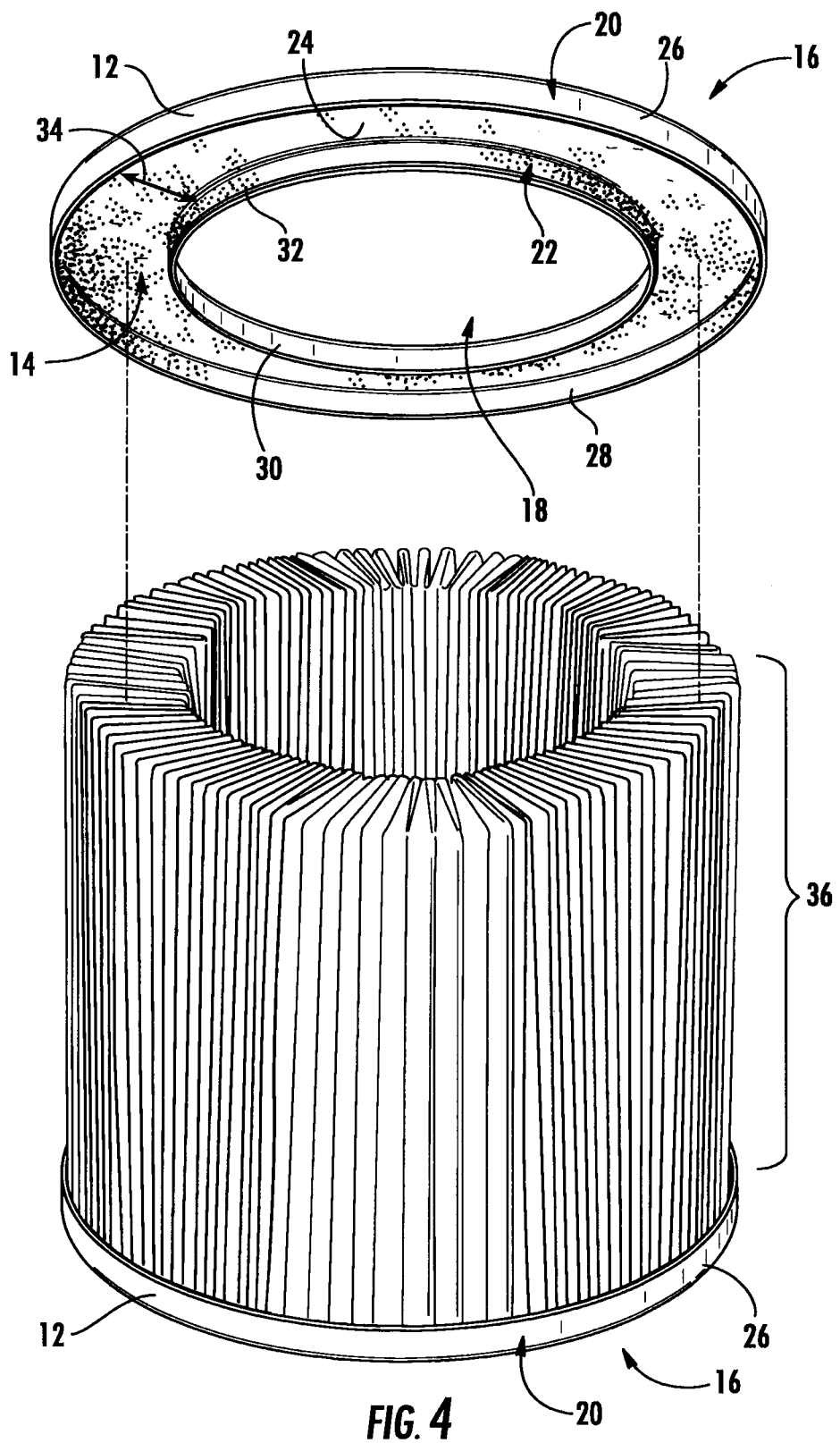
FIG. 4 is a perspective view showing an entire air filter installed into a first end cap and a second end cap in an exploded position.

A complete pleated paper filter material within the first filter cap with a second filter cap 16 is shown in an exploded manner in FIG. 4. The filter media 36 is shown as typically found, in its unitary and generally tubular-shaped form. The filter media is typically a pleated paper filter media, but could be any filter media including a half a filter (high-efficiency particulate air filter (HEPA)). The nature of the filter media while not critical is typically one that will effectively bond with the heat sensitive adhesive such as the plasticizer and more typically allow the adhesive to impregnate the heat sensitive adhesive into the filter material.

Figure 5:
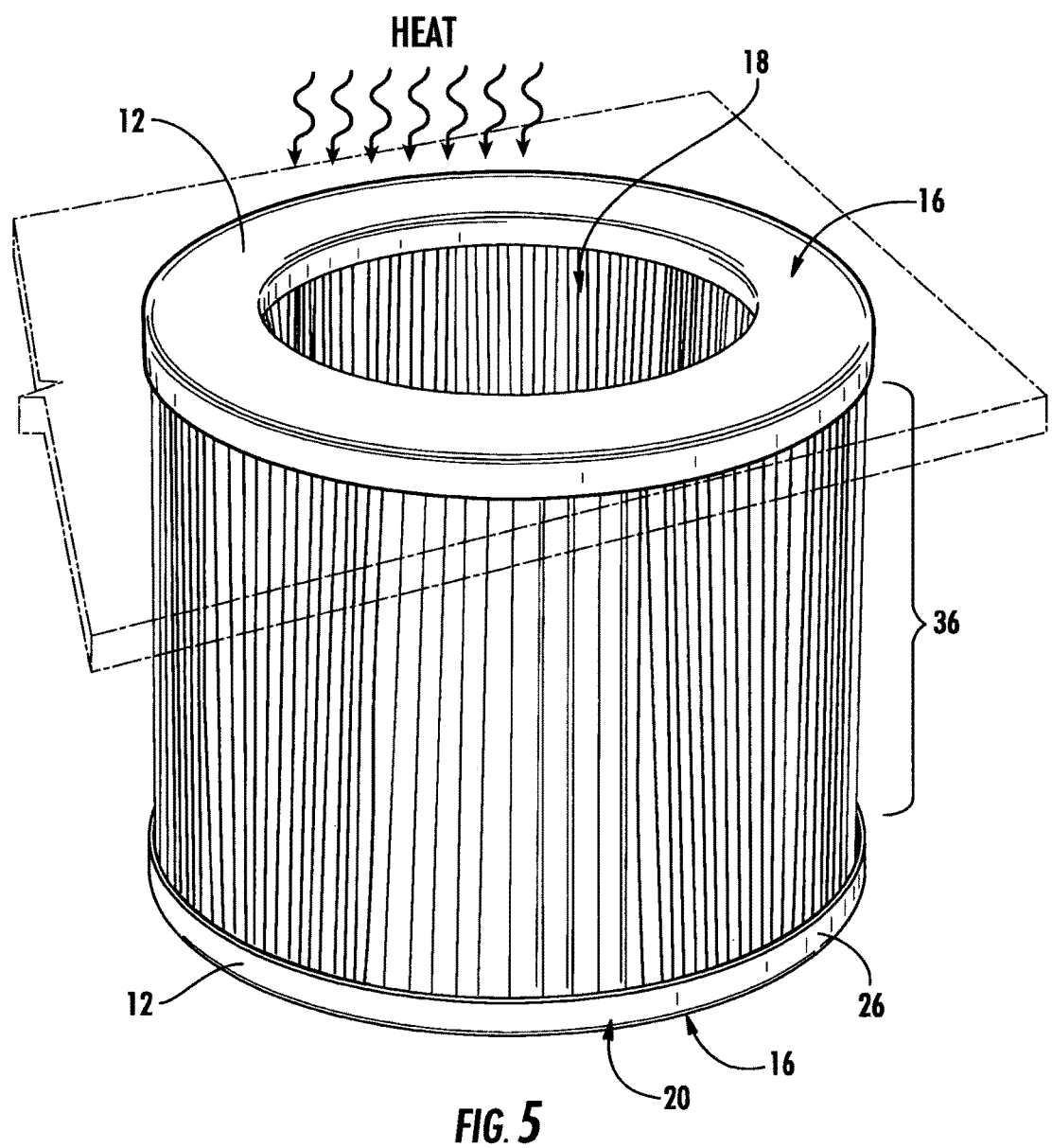
FIG. 5 shows a perspective view of a filter assembly according to an aspect of the present invention having a heat plate applying heat to the base portion of a second filter end cap applied over a second end of a filter.

FIG. 5 shows a heat source being applied to the outside surface of the base 24 of the second filter cap 16 to activate the adhesive and adheres the second filter cap in position on the second of the filter media. Generally speaking, while the filter cap may have alternative constructions, the first filter cap and second filter cap for a given air filter are typically identical to one another and matingly engage the filter media as discussed herein. While shown as a cylindrical filter media and circular filter caps, the present invention is not limited thereto. The filter media may conceivably be any shape and the filter cap may correspond to that alternative shape. For example, the filter media may have a rectangular or square cross section and the filter cap(s) correspondingly have a square or rectangular configuration to receive the filter media.

Figure 6:
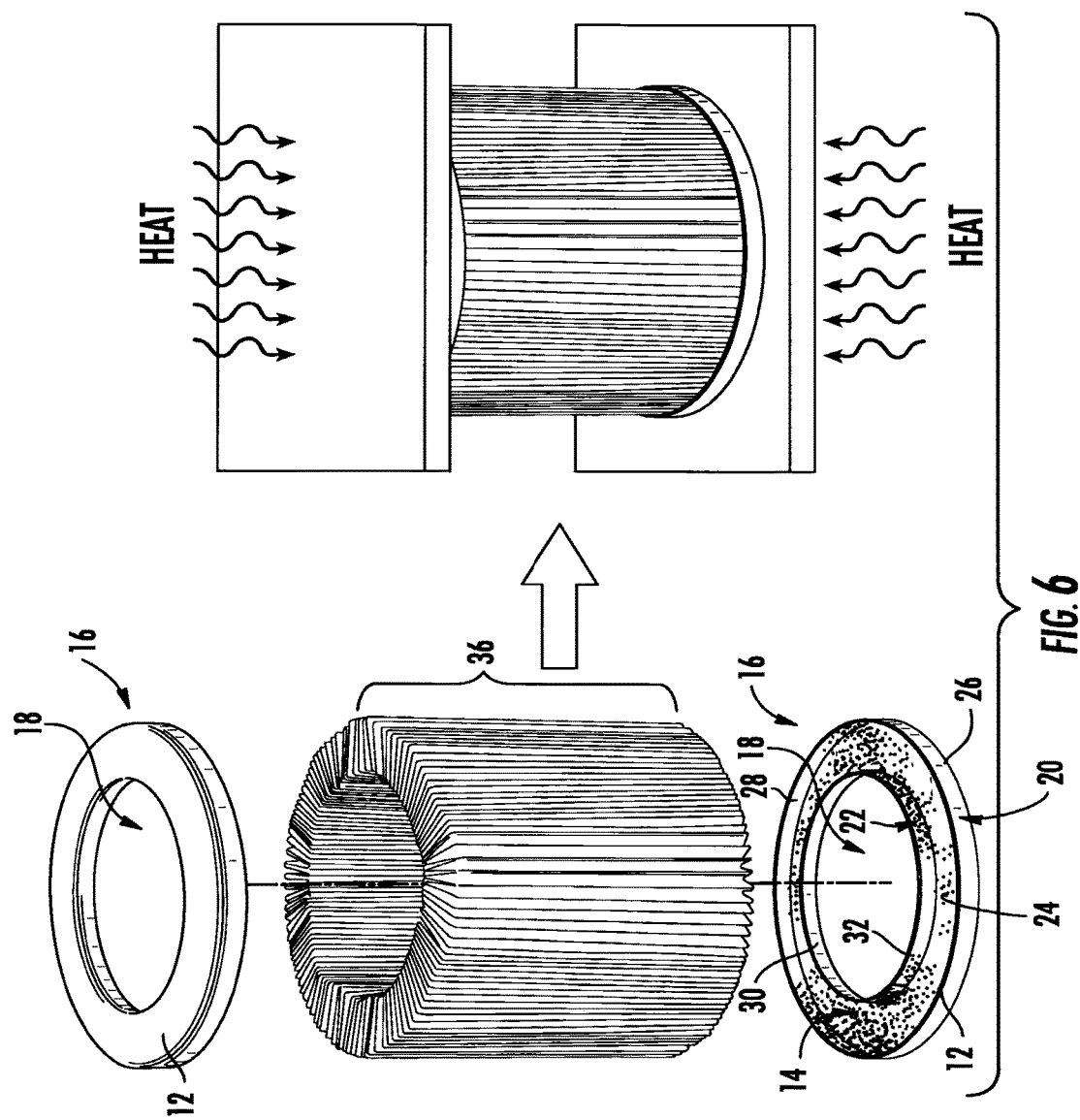
FIG. 6 shows an exploded view and a dual heat application to both a first and second filter cap according to an aspect of the present disclosure.

As shown in FIG. 6, the first and second filter cap 16 may be engaged with the filter media 36 and two separate heat sources may simultaneously apply heat to each filter cap to simultaneously activate and adheres the filter caps to the filter media. In this manner, more process efficiencies are gained. As will be appreciated, the present invention allows for the elimination or virtual elimination of human application of adhesive. The process of producing the filter assembly may be entirely automated and/or human interaction limited to positioning of the filter caps on the top and bottom portion of the filter material and/or human placement of the non-adhered filter assembly onto one or more heat surfaces to form the filter assembly and removal of the completed and adhered filter assembly from the system. Advantageously, as discussed above, the filter caps may be produced using the identical machining process(es) typically utilized to produce filter caps, which normally involves the use of the dye press.

Figure 7:
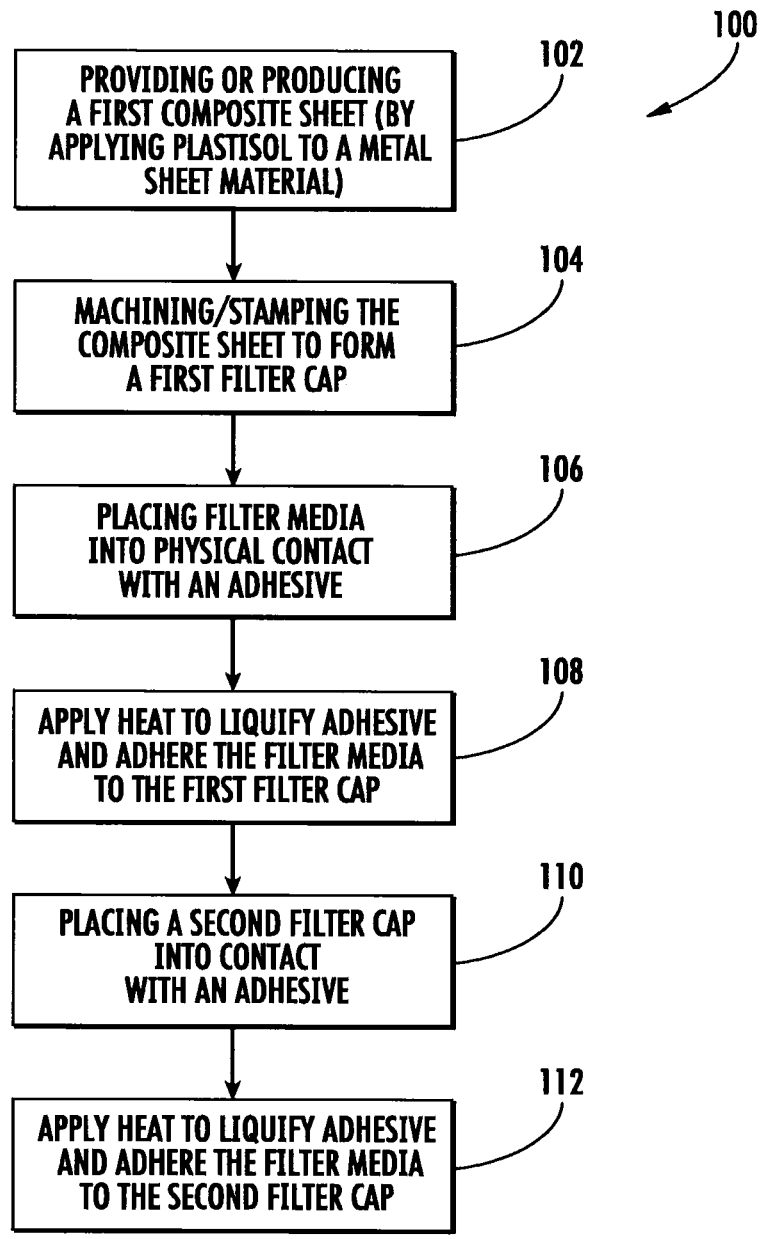
FIG. 7 shows a flow chart of a method making a filter assembly according to an aspect of the present disclosure.

As shown in FIG. 7, the process 100 according to the present invention generally involves providing or forming a first composite sheet 102, which typically is done by applying liquefied plastisol or other heat liquefied adhesive to a surface of a sheet metal and allowing the adhesive to solidify and adhere to the metal sheet to form the composite sheet. The method also typically includes stamping or otherwise machining the composite sheet to form a first filter cap 104. Thereafter, the method involves placing a filter media into physical contact with an adhesive 106 typically within a channel defined by the walls of the filter cap. In the next step heat is applied to the filter cap to liquefy the adhesive and adheres the filter media to the first filter cap 108. Next, the method involves placing a second filter cap into contact with the adhesive 110 and applying heat to the filter cap to liquefy or otherwise activate the adhesive of the second filter cap 112.

The invention claimed is:

1. A filter assembly comprising:
a first filter cap and a second filter cap each having a base section with a filter facing surface, an outer facing surface, and at least one perimeter wall having a surface and located at an inner perimeter of the filter cap and/or an outer perimeter of the filter cap, wherein the at least one perimeter wall extends upwardly from the base section and wherein the perimeter wall or walls defines the base section of the filter cap and wherein the filter facing surface of the base section and the filter facing surface of the at least one perimeter wall each have a height with a heat liquefiable adhesive on the surface of the at least one perimeter wall for the height of the at least one perimeter wall; and
a filter media adhered to the base section of the first filter cap and the second filter cap by the heat liquefiable adhesive at a first filter cap engaging end portion of the filter media and a second filter cap engaging end portion of the filter media; wherein the first filter cap engaging end portion and the second filter cap engaging end portion are at opposite ends of the filter media and adhered such that some of the heat liquefiable adhesive is impregnated in at least the first filter cap engaging end portion and the second filter cap engaging end portion of the filter media and the heat liquefiable adhesive is impregnated into the filter media along the surface of the at least one perimeter wall for the height of the at least one perimeter wall; and
wherein the first filter cap and the second filter cap each have at least two layers of material, a metal layer on the exterior facing side of the heat liquefiable adhesive and a heat liquefiable adhesive layer on the filter facing surface; wherein the heat liquefiable adhesive is liquid at temperatures above about 400° F. and solid at temperatures below about 350° F.; and wherein the heat liquefiable adhesive adheres to the surface of the metal layer and is in solid form at room temperature prior to and after adherence of the first filter cap and the second filter cap with the filter media.

2. The filter assembly of claim 1, wherein the metal layer is sheet steel having a melting point of about 2500° F. and wherein the filter media is an air filter chosen from the group consisting of: a pleated paper filter and a high-efficiency particulate air filter; wherein the heat liquefiable adhesive liquefies at a temperature of about 450° F. or greater; and wherein the base section and the at least one upwardly extending perimeter wall are contiguous with one another and are not connected by a fastener or adhesive material.

3. The filter assembly of claim 1, wherein the heat liquefiable adhesive is a plastisol with a melting point of about 350° F. and include polyvinyl chloride particles having a size from about 0.2 to 15 mcg.

4. The filter assembly of claim 1, wherein the base section of the first filter cap, the base section of the second filter cap, or both the base section of the first filter cap and the base section of the second filter cap have a circular shape.

5. The filter assembly of claim 1, wherein the at least one upwardly extending wall is contiguous with the base section and is formed from a single piece of composite sheet.

6. The filter assembly of claim 1, wherein filter media adheres to the first filter cap and/or the second filter cap at a channel that is defined by an upwardly extending ridge of a bulbous center section that is stamped in the first filter cap the second filter cap or both the first filter cap and the second filter cap.

7. The filter assembly of claim 1, wherein filter media adheres to the first filter cap, the second filter cap or both the first filter cap and the second filter cap at a channel that is defined by structures selected from the group consisting of: an upwardly extending ridge of a bulbous center section, an inner upwardly extending wall, and an outer upwardly extending wall.

8. A filter assembly comprising:
a filter cap having a base section with a filter facing surface and an outer facing surface and at least one perimeter wall at an inner perimeter of the filter cap, an outer perimeter of the filter cap or both the inner perimeter of the filter cap and the outer perimeter of the filter cap, wherein the at least one perimeter wall extends away from the base section and wherein the filter facing surface of the base section and the filter facing surface of the perimeter wall each have a heat liquefiable adhesive on the filter facing surface thereof wherein the heat liquefiable adhesive on the filter facing surface of the perimeter wall extends above a top surface of the heat liquefiable adhesive on the filter facing surface of the base section;
a first end of a filter media and the filter cap adhered to one another by the heat liquefiable adhesive at a filter cap engaging end portion in both a horizontal and vertical direction; and
wherein the filter cap has at least two layers, a metal layer and a heat liquefiable adhesive layer; wherein the heat liquefiable adhesive is liquid at temperatures above about 400° F. and solid at temperatures below about 350° F.; and wherein the heat liquefiable adhesive adheres to the filter facing surface of the metal layer in solid form at room temperature.

9. The filter assembly of claim 8, wherein the filter cap is a first filter cap and the filter cap engaging end portion is a first filter cap engaging end portion and the filter assembly further comprises a second filter cap having a base section with a filter facing surface and an outer facing surface and at least one perimeter wall at an inner perimeter of the second filter cap the outer perimeter of the second filter cap or both the inner perimeter of the second filter cap and the outer perimeter of the second filter cap, wherein the at least one perimeter wall extends away from the base section and wherein the filter facing surface of the base section and the filter facing surface of the perimeter wall of the second filter cap each have a heat liquefiable adhesive on the filter facing surface thereof; and
a second end of the filter media adhered to the second filter cap by the heat liquefiable adhesive at a second filter cap engaging end portion wherein the second filter cap engaging end portion is at an opposite end of the filter media as the first filter cap engaging portion and adhered to the filter media by the heat liquefiable adhesive that impregnates at least the second filter cap engaging end portion of the filter media and adheres to a metal exterior facing layer of the second filter cap; and
wherein the second filter cap has at least two layers, a metal layer and a heat liquefiable adhesive layer and wherein the heat liquefiable adhesive is liquid at temperatures above about 400° F. and solid at temperatures below about 350° F.; and wherein the heat liquefiable adhesive adheres to the filter facing surface of the metal layer in solid form at room temperature.

10. The filter assembly of claim 9, wherein the first filter cap, the second filter cap, or first filter cap and the second filter cap have a rectangular base section.

11. The filter assembly of claim 9, wherein the at least one perimeter wall is contiguous with the base section and is formed from a single piece of composite sheet of metal and heat liquefiable adhesive in layers.

12. The filter assembly of claim 9, wherein filter media adheres to the first filter cap, the second filter cap, or both the first and the second filter cap at a channel that is defined by an upwardly extending ridge of a bulbous center section that is stamped in the first filter cap, the second filter cap, or both the first and the second filter cap.

13. The filter assembly of claim 9, wherein filter media adheres to the first filter cap, the second filter cap, or both the first and the second filter cap at a channel that is defined by structures selected from the group consisting of an upwardly extending ridge of a bulbous center section, an inner upwardly extending wall, and an outer upwardly extending wall.

14. The air filter assembly of claim 8, wherein no fastener or adhesive is required to adhere the at least one perimeter wall to the base section and an outer surface of an outer perimeter wall and an inner facing surface of an inner perimeter wall are free of heat liquefiable adhesive and the entire inner facing surface of the outer perimeter has heat liquefiable adhesive thereon.

15. The air filter assembly of claim 9, wherein the first filter cap and the second filter cap are adhered to the filter media, wherein the filter media is a cylindrically shaped pleated paper.

16. An air filter assembly comprising:
a first filter cap and a second filter cap each having a base section with a filter facing surface and an outer facing surface and at least one perimeter wall located at an outer perimeter of the first filter cap, the second filter cap or both the first and second filter cap, the first and the second filter cap having a filter facing surface and an exterior facing surface wherein the at least one perimeter wall extends away from the base section and the filter facing surfaces of the first filter cap and the second filter cap face one another, and wherein the perimeter wall defines the base section of the filter cap and wherein the filter facing surface of the base section and the filter facing surface of the perimeter wall each have a plastisol adhesive on the filter facing surface thereof and the plastisol adhesive on the filter facing surface of the filter facing surface of the perimeter wall extends above the plastisol adhesive on the filter facing surface of the base section; and
a filter media adhered to the first filter cap and the second filter cap by the plastisol adhesive at a first filter cap engaging end portion and a second filter cap engaging end portion wherein the first filter cap engaging end portion and the second filter cap engaging end portion are opposite ends of the filter media and adhered such that the plastisol adhesive of the first filter cap adheres at least a first filter cap engaging end portion and a metal exterior facing layer of the first filter cap to one another and a second filter cap engaging end portion of the filter media and a metal exterior facing layer of the second filter cap to one another; and
wherein the first filter cap and the second filter cap have at least two layers of material, a metal layer on the exterior facing side of a plastisol adhesive layer; and wherein the plastisol adhesive is liquid at temperatures above about 400° F. and solid at temperatures below about 350° F.

17. The air filter assembly of claim 16, wherein the filter media is a high-efficiency particulate air filter that bonds to the plastisol adhesive when liquefied.

18. The filter media of claim 16, wherein the filter media matingly engages with a channel in the first filter cap, the second filter cap, or both the first filter cap and the second filter cap.

19. The air filter assembly of claim 18, wherein the channel in the first filter cap or the second filter cap is defined by structures chosen from the group consisting of: an upwardly extending ridge of a bulbous center section, an inner upwardly extending wall, and an outer upwardly extending wall.

20. The channel of claim 19, wherein a layered and initially flat composite sheet comprising the plastisol adhesive in solid plastisol form and sheet metal is die stamped to form the first filter cap.

* * * * *